Patented Dec. 20, 1949

2,491,499

UNITED STATES PATENT OFFICE 2,491,499

TREATING LIGNO-CELLULOSIC MATERIALS AND RESULTING PRODUCT

Raphael Katzen, Cincinnati, Ohio, and Joseph Pearlstein, Arlington, Va., assignors, by mesne assignments, to Diamond Alkali Company, Cleveland, Ohio, a corporation of Delaware No Drawing. Application February 12, 1946, Serial No. 647,214

10 Claims. (Cl. 260—124)

This invention relates to the treatment of ligno-cellulosic materials, and more particularly to a method of preparing halogenated and alkoxylated lignin from said materials and to a new composition of matter.

Prior efforts to make lignin halide have included the treatment of the ligno-cellulosic material in (1) an aqueous medium, or (2) an anhydrous or substantially anhydrous medium containing no appreciable quantity of an organic substance capable of reacting with halogen to form an organic hypohalite. The treatment in an aqueous medium probably results in the formation of hypohalous acid which reacts with alkoxyl groups in the lignin molecules; in any event these groups are oxidized and removed from the molecules and quinoid structures are established within said molecules. Undesirable chemical reactivity, discoloration and gumminess of the lignin halide results from the formation of these quinoid structures. On the other hand, while treatment in an anhydrous or substantially anhydrous medium does not result in the formation of any substantial number of quinoid structures in the lignin halide molecule, the resulting lignin halide is, nevertheless, not readily controlled in resinification reactions because of its chemical instability. In terms of the lignin halide product neither of these processes has been entirely satisfactory.

The present process is predicated on our discovery that unexpected, unpredictable and generally superior results may be obtained by treating the ligno-cellulose with a halogen in a medium which is anhydrous or contains up to about 5% of water and which contains an organic substance which is a solvent for alkoxyl lignin halide, is capable of reacting with halogen to form an organic hypohalite and is capable of effecting alkoxylation of lignin concurrent with halogenation thereof.

The superiority of our lignin halide product is attributable to the fact that it contains few, if any, quinoid structures and to the fact that it is alkoxylated, having undergone alkoxylation simultaneously with halogenation. It has greater chemical stability than unalkoxylated lignin halide and because of this property, it is possible to control effectively the direction and extent of polymerization or condensation reactions involving it, and to adjust the conditions attending such reactions to obtain any of a wide variety of resins having varied physical and chemical properties.

The characteristic of our process is the halogenation and alkoxylation of ligno-cellulosic materials in a non-aqueous or substantially non-aqueous medium, the reactions being carried out in temperature range between about 45° C. and about 150° C. and with or without the employment of pressure. Specifically, the non-aqueous or substantially non-aqueous medium is an organic substance which is a solvent for alkoxyl lignin halide, is capable of reacting with free halogen to form an organic hypohalide and is capable of effecting alkoxylation of lignin concurrent with halogenation thereof and boils at a temperature below the decomposition temperature of the alkoxyl lignin halide in solution which is, we believe, somewhere near 150° C. There are a variety of organic substances which meet these requirements, including alcohols, ethers, and alcohol-ethers. Suitable alcohols include methyl, ethyl, n-propyl, iso-propyl, n-butyl, iso-butyl, tertiary-butyl and n-amyl. Suitable ethers include propyl ether, propyl butyl ether, butyl ether, butyl amyl ether, amyl ether and the cyclic ether dioxane. Ethylene glycol mono methyl ether and ethylene glycol monoethyl ether are suitable alcohol-ethers.

Halogenation is accomplished preferably through the use of chlorine absorbed by the said medium; this may be accomplished by passing chlorine gas into the medium or by use of solid or liquid organic hypochlorites. The halogenating medium is raised in temperature, preferably to the boiling point of the solvent material employed. These temperatures are employed when the reaction is effected at atmospheric pressure.

The reaction may be effected under pressure as, for example, at about 10 to about 200 pounds per square inch gauge pressure and thereby the temperature may be correspondingly increased but not above the decomposition point of alkoxyl lignin halide, and the reaction greatly accelerated.

As an indication of more specific methods of operation, we set forth the following illustrative, but not limiting, examples:

Example I 25 grams of maple wood sawdust or chips are suspended in 200 cc. of dioxane in a glass flask equipped with a reflux condenser. While the suspension is maintained at or near the boiling point temperature of the dioxane, chlorine is passed in for a period of one hour. The mixture is then filtered, the residual crude cellulose washed with additional dioxane and then with water. The dioxane fraction is then concentrated by evaporation and poured into several times its own volume of water, to precipitate the ethoxyl lignin chloride. The latter is then filtered off, washed with water and dried. Aqueous filtrates may be treated to recover additional dissolved carbohydrates, and other reaction products which are formed in the above reaction and are not previously precipitated.

Example II 25 grams of maple wood sawdust are suspended in 200 cc. of methanol in the apparatus described above. While the suspension is maintained at or near the boiling point temperature of the methanol, chlorine is passed in for two hours. The methoxyl lignin chloride, cellulose, and solvent fractions are recovered and treated in a manner similar to that described above.

Example III 50 grams of maple wood sawdust which have been extracted with methanol-benzene and water to remove oily and resinous impurities, and then dried, are suspended in 400 cc. of methanol. While the suspension is maintained at or near the boiling point temperature of the methanol, it is treated with chlorine for 2½ hours. The methoxyl lignin chloride, cellulose and solvent fractions are recovered and treated as described in the previous examples, and the products yielded are similar to those obtained above.

Example IV 25 grams of maple wood sawdust are dried in an oven at 55° C. for 24 hours and then suspended in 200 cc. of methanol which has been de-hydrated by treatment with lime, followed by distillation under anhydrous conditions. While the suspension is maintained at or near the boiling point temperature of the methanol in the apparatus described above, chlorine previously dried by bubbling it through concentrated sulphuric acid is passed into the solution. When absorption of the chlorine decreases, the various fractions are recovered and treated as above, with similar results.

Example V 20 grams of hydrolyzed ligno-cellulose (such as that produced according to U. S. Patent 2,156,159) are suspended in 100 cc. of methanol. After the temperature of the suspension has been brought to about 45° C., chlorine gas is passed there into until absorption decreases. During this reaction the original dark-brown colored residue becomes yellow-orange in color, while the solvent layer, which was originally dark-brown due to solution of some soluble lignin, is also changed to a light yellow color. After completion of the reaction, the insoluble crude-cellulose is separated from the solution of methoxyl lignin chloride by filtration. An ether wash removes additional methoxyl lignin chloride. Both methoxyl lignin chloride fractions are recovered by concentration of the respective solvent layers and precipitation in water.

Example VI 50 grams of white pine shavings are suspended in 1000 cc. of methanol, the suspension is heated to the boiling point of said methanol and while maintained at or near that temperature, chlorine gas is passed in until absorption decreased (approximately 1 hour). The solvent layer is then filtered off from the residual crude cellulose, which may be utilized as such, or purified according to known methods. Methanol is recovered by partial evaporation from the solvent layer, and then the methoxyl lignin chloride is precipitated by pouring the concentrated extract into water. An amorphous cream-colored powder is obtained after filtering, washing and drying.

In the above examples, sharp separation of cellulose and methoxyl lignin chloride is effected by reaction completed in from about 1 to about 3 hours. In such reaction under commercial conditions and in closed systems the use of pressure will increase the speed of the reaction as the partial pressures of the halogen employed is increased; and solvent losses will be avoided, as, for example, any material loss of methanol when that solvent is employed. It also will be understood that when the reaction is effected under pressure, the solvents will be maintained in liquid form.

Despite the variations in the types of materials and the method of processing used in the above examples, the products obtained are very similar chemically and physically. In order to identify and correlate these materials, several analytical methods were used which will be described herewith:

The methoxyl content of lignin is usually the primary identifying factor in work on this class of materials. By the method of E. P. Clark (J. A. O. A. C., vol. 41, 3468, p. 25) this value is determined readily. In this analytical procedure the methoxyl groups in the lignin or lignin chloride derivative are split off by hydrolysis with strong hydriodic acid, and boil off in the form of a vapor of methyl iodide. This vapor is absorbed in solution of bromine in glacial acetic acid. Upon completion of the reaction, the iodine equivalent of the methyl iodide is liberated by acidification and treatment with potassium iodide. Titration of this free iodine with sodium thiosulphate then indicates the amount of methyl iodide which was distilled over.

The chlorine content of the various chlorinated derivatives was determined by the Parr bomb method (I. & E. C., Anal. Ed., 4, 352, 1934). In this analysis a weighed sample of material is mixed with several times its weight of sodium peroxide and a small amount of benzoic acid and the mixture placed in the Parr bomb. After ignition by an electrical wire, and cooling, the oxidized mixture is dissolved in water, acidified, and the chlorine precipitated as silver chloride. By weighing this precipitate the amount of chlorine in the sample can be determined. The table which follows indicates the methoxyl and chlorine contents of the methoxyl lignin chloride fractions obtained from maple wood, using methanol as the non-aqueous medium.

Table

| Above Example | Fibre | Methoxyl Lignin Chloride | |
|---|---|---|---|
| | | Per Cent Methoxyl | Per Cent Chlorine |
| II | Maple Wood Containing 5% H₂O. | 22.4 | 28.0 |
| III | Extracted and Dried Maple Wood. | 19.8 | 29.5 |
| IV | Dried Maple Wood | 20.8 | 28.1 |

The foregoing analytical methods were employed in determining the values reported in the above table.

By substituting an aqueous medium for the methanol in Example II, a lignin chloride containing about 5% of methoxyl will be obtained. If, on the other hand, the medium employed is non-aqueous or substantially non-aqueous and contains no appreciable quantity of an organic substance capable of reacting with chlorine to form an organic hypochlorite, the lignin chloride product will contain about 14% of methoxyl. In both instances the product contains about 28% of chlorine, indicating that the lignin chlorination reaction is affected little, if at all, by these various media.

It may be seen that despite the different treatments of the raw material, the products obtained from the process of our invention are substantially constant in composition. Although the methoxyl lignin chlorides obtained are not pure compounds, they are probably a series of polymers of similar constitution by the analysis. The chlorinated products obtained from the oily and resinous impurities in the wood are similar to the methoxyl lignin chloride as will hereinafter appear.

It will be obvious that through the use of ethanol, propanol, butanol, ethyl, ethyl propyl ether, ethylene glycol monoethyl ether, and the like, the alkoxylation will be ethoxylation, propoxylation, butoxylation or the like, depending upon the solvent employed as the halogenating medium, and will not be methoxylation as in most of the foregoing examples. Of course, the alkoxyl lignin halide products differ according to the kind of alkoxyl groups added to the lignin molecule by this process, but because natural lignin contains a substantial number of methoxyl groups compared to the total number of alkoxyl groups in the products of this invention, the differences in physical properties are generally minor and only matters of degree. No demethoxylation occurs during the process of this invention.

The alkoxyl lignin halide products of the process of the present invention are water-insoluble, cream-colored, non-hygroscopic, low-polymers which have low melting points and are substantially completely soluble in methanol and ethanol but are substantially completely insoluble in dilute aqueous (5%) caustic soda.

By "non-hygroscopic" we mean that there is no affinity for water, that is, that the products are readily dried to constant weight and do not extract moisture from the atmosphere. Actually our drying practice has consisted of exposing our products as they are freshly prepared to an air temperature of 50° C. for 16 hours, which is conveniently done through the use of a conventional drying oven. As for the melting points of our products, the methoxyl lignin chlorides prepared as described in the above examples melt at temperatures in the range between 120° C. and 135° C., fully 30° C. to 40° C. below the melting points of any heretofore known lignin halides bearing any resemblance to our products. As might be expected, factors such as the variety and number of alkoxyl groups in the product, and the variety and number of halogen atoms in the product affect the melting point. To the best of our knowledge, however, our products are all entirely unique. This uniqueness we attribute to their unprecedented alkoxyl content and their high halogen content, which features are due to the method of our invention. Compared to other methods of treating lignins to produce lignin halides, ours is a "flash" process and it results in rapid saturation of available bonds in the lignin molecules thus forestalling the formation of linkages between such bonds and polymerization of the lignins. Apparently at temperatures between about 45° C. and about 150° C. the alkoxylation and halogenation of available lignin molecule bonds proceeds at a much more rapid rate than the polymerization reactions involving such bonds, and it is upon this novel conception that this invention is based.

When methanol is used as the alkoxyl lignin halide solvent and alkoxylating agent and chlorine is used to effect lignin halogenation, a methoxyl lignin chloride product is obtained which contains between about 16% and about 25% of methoxyl, and between about 23% and about 33% of chlorine, depending upon the nature of the ligno-cellulosic material furnishing the lignin. Methoxyl lignin chloride containing between about 19% and about 22% of methoxyl, and between about 26% and about 29% of chlorine may be produced if hardwood is the source of the treated ligno-cellulose. Methoxyl lignin chloride containing between about 25% of methoxyl, and between about 23% and about 33% of chlorine may be produced from softwood ligno-cellulose. The ligno-cellulose of all except for a few softwoods such as redwood, sugar pine, and yellow pine may be treated to produce a methoxyl lignin chloride containing between about 19% and about 22% of methoxyl, and between about 26% and about 30% of chlorine. Chlorination of lignin in ligno-cellulose without methoxylation or demethoxylation results in a product containing not in excess of about 14% of methoxyl and as little as about 11% methoxyl, with the ligno-cellulose of some varieties of softwood.

The crude cellulose residues obtained from this process contain very little chlorine and considerably lesser amounts of methoxyl than the lignin derivatives do. Also it is possible to carry out an alkoxylation of the cellulose fraction by use of the proper solvent and proper reacting conditions. Thus, in addition to the relatively pure forms of cellulose which can be obtained by this process, cellulose which is more or less methoxylated, ethoxylated, etc., may also be produced. The crude cellulose residues obtained by this process may be subjected to various treatments with mild alkali and aqueous bleaching agents, to improve their quality.

It may be pointed out that the presence of oily and resinous materials in the wood or plant fibre treated is not a problem in our process. These oily and resinous materials have constituted a great problem in the pulping of all plant fibres, particularly southern soft woods. Previously attempted separation processes do not attack these oily and resinous materials to an appreciable extent. In our process, however, these materials are halogenated and alkoxylated and placed into complete solution. They are substantially completely removed by this process from the cellulose. In the table above Examples II and IV represented maple wood having its normal content of oils and resins, the table showing that the recovered methoxyl lignin chloride was of the same character as that obtained by the use of maple wood from which the oils and resins have been extracted. Thus it is believed that the chlorinated oils and resins are in part dissolved in the aqueous diluted medium remaining after precipitation of the methoxyl lignin chloride and in part converted into bodies closely analagous to the methoxyl lignin chloride and precipitated therewith.

Bromine, iodine or fluorine or sources of halogens other than chlorine may be employed.

There being many variables, chlorine has been specified in the examples because of its relatively low cost and availability. As solvents, any organic solvent or mixture of solvents may be used which can dissolve the alkoxyl lignin halide formed during the reaction, can accomplish alkoxylation of lignin and are not adversely affected by the halogenation reaction. There should not be sufficient water present to cause an appreciable oxidation reaction in the presence of halogen. We have discovered however, that the halogenation may be conducted in the presence of as much as about 5% of water on the basis of the weight of the reaction mass.

Furthermore, as described in now abandoned copending application Serial Number 628,973, filed Nov. 15, 1945, organic reactants, which may give condensation, polymerization, esterification and similar known reactions with the alkoxyl lignin halide, may be added to the medium used in carrying out the present invention, or used as the non-aqueous medium. Thus, resinous derivatives of the alkoxyl lignin halides are obtained directly from the halogenation reaction, and are suitable for use in plastics, paints and varnishes, on exchange products and the like.

Light has an important influence on this process, some wave lengths accelerating the reaction so rapidly that it may become uncontrollable. By proper control of the intensity and wave length of light permitted to act on the reactants, the rate and extent of reaction may be controlled within desired limits.

In the invention described above it will be understood that the term "alkoxyl lignin halide" referred to in the claims and in the specification, includes a group of polymers of similar chemical nature; while the terms "cellulose" and "crude cellulose" refer to the total carbohydrate fraction of the ligno-cellulose material and may include varying small amounts of residual lignin of alkoxyl lignin halide, depending on the efficiency of the separation. In general, the particular materials listed, such as fibres, solvents, resinification reactants and halogens are in no way indicated as being inclusive, but are listed for purposes of illustration: it is within the scope of this invention to include various equivalent fibres, solvents, resinification reactants, halogens and sources of halogens which give results similar to those which have been mentioned above. It is also within the scope of this invention to include the several variables in the halogenation process controls, in order to obtain optimum yields or varying characteristics in the products.

This is a continuation-in-part of now abandoned application Serial Number 496,480, filed July 28, 1943.

Having thus described the present invention so that others skilled in the art may be able to understand and practice the same, we state that what we desire to secure by Letters Patent is defined in what is claimed.

What is claimed is:

1. The method of preparing methoxylated halogenated lignin which includes the step of treating a mixture containing ligno-cellulosic material, methanol, and less than about 5% of water, with a halogen for less than 3 hours while said mixture is maintained in the temperature range between about 45° C. and about the boiling point of methanol.

2. The method of preparing methoxylated and chlorinated lignin which includes the step of treating a mixture containing ligno-cellulosic material, methanol, and less than about 5% of water, with chlorine for less than 3 hours while said mixture is maintained in the temperature range between about 45° C. and about the boiling point of methanol.

3. The method of preparing methoxylated and chlorinated lignin which includes the step of treating a mixture containing wood fibre, methanol, and less than about 5% of water, with chlorine for a period of less than 3 hours while said mixture is subjected to a pressure within the range between about 10 and about 200 pounds per square inch and to a temperature between about 45° C. and about the boiling point of methanol under the increased pressure.

4. A solid, cream colored, non-hygroscopic low polymer, methoxyl lignin chloride substantially completely soluble in methanol and ethanol and substantially completely insoluble in 5% aqueous sodium hydroxide having a melting point between about 120° C. and about 135° C., said methoxyl lignin chloride being derived from lignocellulosic material by steps which includes treating a mixture containing lignocellulosic material, methanol, and less than about 5% of water, with chlorine for less than 3 hours while said mixture is maintained in the temperature range between about 45° C. and about the boiling point of methanol.

5. The method of preparing alkoxylated and halogenated lignin, which includes the steps of treating a mixture of lignocellulosic material and an organic solvent for alkoxylated lignin halide selected from the group consisting of aliphatic alcohols, aliphatic ethers, aliphatic alcohol-ethers, all boiling at a temperature below about 150° C., and dioxane, in the presence of less than about 5% of water, with halogen for a period of less than three hours, while said mixture is maintained at a temperature in the range between about 45° C. and about 150° C.

6. The method of preparing alkoxylated and halogenated lignin, which includes the steps of treating a mixture containing lignocellulosic material, an aliphatic alcohol having a boiling point below about 150° C. and less than about 5% of water, with a halogen for a period of less than three hours, while said mixture is maintained in the temperature range between about 45° C. and about 150° C.

7. The method of preparing alkoxylated and chlorinated lignin, which includes the step of treating a mixture containing lignocellulosic material, an aliphatic alcohol having a boiling point below about 150° C. and less than about 5% of water, with chlorine for a period of less than three hours, while said mixture is maintained in the temperature range between about 45° C. and about 150° C.

8. The method of preparing alkoxylated and chlorinated lignin, which includes the step of treating a mixture containing lignocellulosic material, an aliphatic alcohol having a boiling point below about 150° C. and less than about 5% of water, with chlorine for a period of less than three hours, while said mixture is subjected to a pressure within the range of about 10 pounds and about 200 pounds per square inch and to a temperature between about 45° C. and about 150° C.

9. The process for separating lignocellulosic materials into alkoxylated lignin chloride and cellulose fractions, which includes the steps of treating a mixture of said lignocellulosic materials, and an organic solvent for alkoxylated lignin chloride selected from the group consisting of aliphatic alcohols, aliphatic ethers, aliphatic alcohol-ethers, all boiling at a temperature below about 150° C., and dioxane, in the presence of less than about 5% of water, with chlorine for less than three hours, while said mixture is maintained in the temperature range between about 45° C. and about 150° C., and separating and removing the solid cellulose from the dissolved alkoxylated lignin chloride.

10. A solid, cream-colored, non-hygroscopic low polymer, alkoxyl lignin halide substantially completely soluble in methanol and ethanol and substantially completely insoluble in 5% aqueous sodium hydroxide, said alkoxyl lignin halide being derived from lignocellulosic material by the steps which include treating a mixture containing lignocellulosic material, and an organic solvent for alkoxylated lignin halide selected from the group consisting of aliphatic alcohols, aliphatic ethers, aliphatic alcohol-ethers, all boiling at a temperature below about 150° C., and dioxane, in the presence of less than about 5% of water, with halogen for a period of less than three hours, while said mixture is maintained in the temperature range between about 45° C. and about 150° C.

RAPHAEL KATZEN.
JOSEPH PEARLSTEIN.

REFERENCES CITED

The following references are of record in the file of this patent:

UNITED STATES PATENTS

| Number | Name | Date |
| --- | --- | --- |
| 1,816,394 | Muller | July 28, 1931 |
| 2,130,550 | Koch | Sept. 20, 1938 |

FOREIGN PATENTS

| Number | Country | Date |
| --- | --- | --- |
| 323,936 | Germany | Aug. 11, 1920 |
| 191,357 | Great Britain | Mar. 22, 1923 |

OTHER REFERENCES

Brauns; "Paper Trade Journal," Oct. 3, 1940, pages 33–39.

Canadian J. Research, 15B, pages 279–294 (1937), Jansen and Bain.